US012724534B2

(12) United States Patent
Lee et al.

(10) Patent No.: US 12,724,534 B2
(45) Date of Patent: Sep. 1, 2026

(54) MEMORY CONTROLLER PERFORMING MAP UPDATE AND METHOD OF OPERATING THE SAME

(71) Applicant: SK hynix Inc., Gyeonggi-do (KR)

(72) Inventors: Do Hyeong Lee, Gyeonggi-do (KR); Jae Min Kim, Gyeonggi-do (KR); In Seo Hwang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 243 days.

(21) Appl. No.: 18/179,361

(22) Filed: Mar. 7, 2023

(65) Prior Publication Data

US 2024/0028204 A1 Jan. 25, 2024

(30) Foreign Application Priority Data

Jul. 25, 2022 (KR) ........................ 10-2022-0092037

(51) Int. Cl.
*G06F 3/06* (2006.01)

(52) U.S. Cl.
CPC ............ *G06F 3/061* (2013.01); *G06F 3/0659* (2013.01); *G06F 3/0679* (2013.01)

(58) Field of Classification Search
CPC ....... G06F 3/061; G06F 3/0659; G06F 3/0679
See application file for complete search history.

(56) References Cited

U.S. PATENT DOCUMENTS 9,164,886 B1 * 10/2015 Phan ..................... G06F 3/0688
2004/0199780 A1 * 10/2004 Seung ............. G11B 20/00688 713/193
2011/0185112 A1 7/2011 Goss
2012/0284450 A1 * 11/2012 Huang ................ G06F 12/0246 711/E12.008
2013/0238838 A1 * 9/2013 Fukutomi ........... G06F 12/0246 711/103
2015/0046665 A1 * 2/2015 Higgins ................ G06F 12/023 711/158
2015/0253992 A1 * 9/2015 Ishiguro ................ G06F 3/0611 711/103
2020/0264984 A1 * 8/2020 Adams ................ G06F 12/1009

FOREIGN PATENT DOCUMENTS

KR 10-2020-0074464 A 6/2020

* cited by examiner

*Primary Examiner* — Eric T Loonan
(74) *Attorney, Agent, or Firm* — IP&T GROUP LLP

(57) ABSTRACT

The present technology relates to an electronic device. According to the present technology, a memory controller may Include a write controller and a map manager. The write controller may search, in response to a write request for a second logical address received from a host during a first write operation for a first logical address, for a descriptor corresponding to the first write operation, determine whether the first logical address and the second logical address overlap, and set a map update flag corresponding to the first write operation based on a result of the determination. The map manager may update mapping information on the first logical address based on the map update flag.

19 Claims, 10 Drawing Sheets

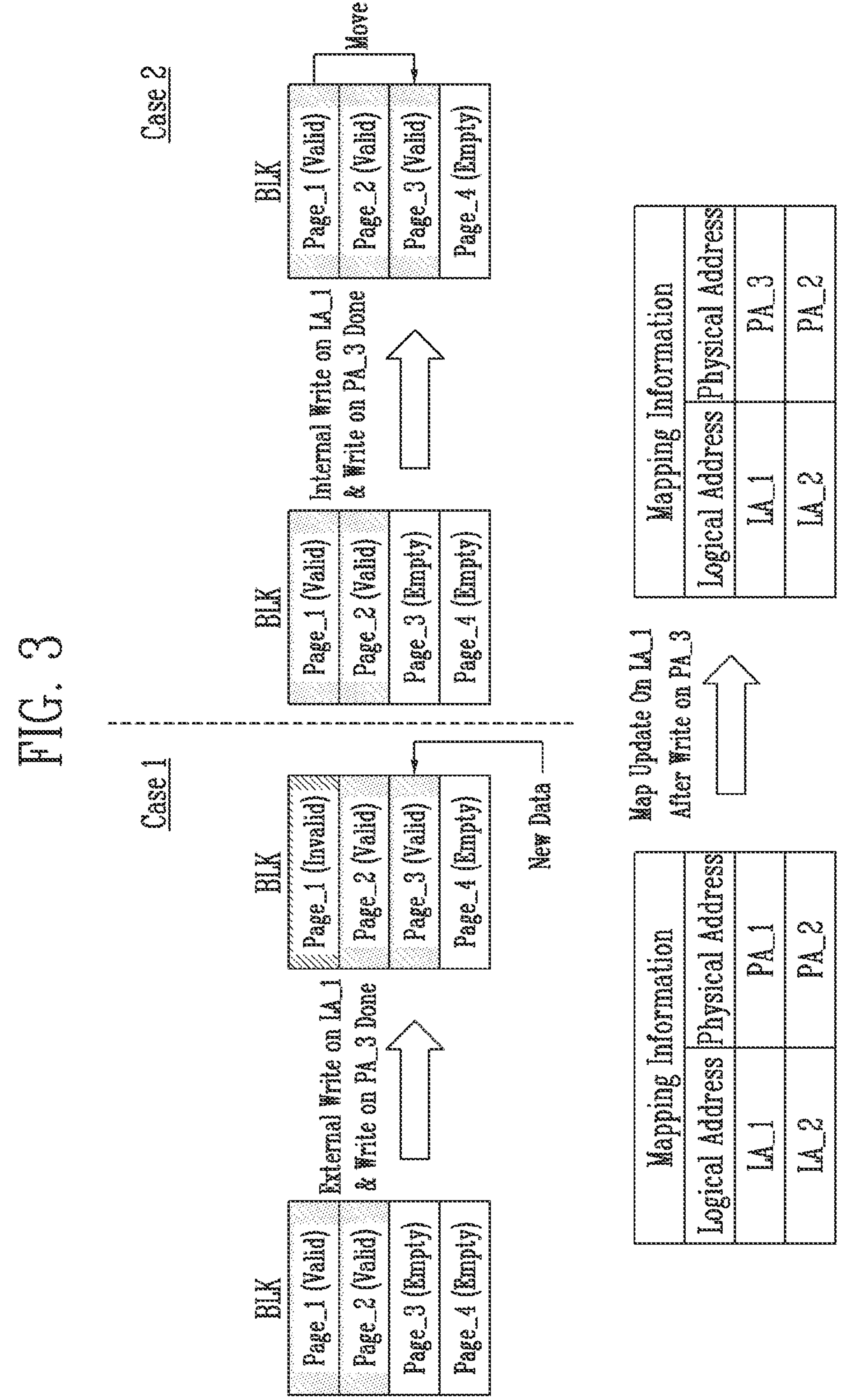
FIG. 3
Case 1
BLK
Page_1 (Valid)
Page_2 (Valid)
Page_3 (Empty)
Page_4 (Empty)
External Write on LA_1
& Write on PA_3 Done
BLK
Page_1 (Invalid)
Page_2 (Valid)
Page_3 (Valid)
Page_4 (Empty)
New Data
Case 2
BLK
Page_1 (Valid)
Page_2 (Valid)
Page_3 (Empty)
Page_4 (Empty)
Internal Write on LA_1
& Write on PA_3 Done
BLK
Page_1 (Valid)
Page_2 (Valid)
Page_3 (Valid)
Page_4 (Empty)
Move
Mapping Information
Logical Address
Physical Address
LA_1
PA_1
LA_2
PA_2
Map Update On LA_1
After Write on PA_3
Mapping Information
Logical Address
Physical Address
LA_1
PA_3
LA_2
PA_2

MEMORY CONTROLLER PERFORMING MAP UPDATE AND METHOD OF OPERATING THE SAME

CROSS-REFERENCE TO RELATED APPLICATION

The present application claims priority under 35 U.S.C. § 119(a) to Korean patent application number 10-2022-0092037, filed on Jul. 25, 2022, the entire disclosure of which is incorporated herein by reference.

BACKGROUND

1. Field of Invention

Various embodiments of the present disclosure relate to an electronic device, and more particularly, to a memory controller and a method of operating the same.

2. Description of Related Art

A storage device is a device that stores data under control of a host device such as a computer or a smartphone. The storage device may include a memory device in which data is stored and a memory controller controlling the memory device. The memory device is classified into a volatile memory device and a nonvolatile memory device.

The storage device may perform a background operation regardless of a request from a host for garbage collection and wear leveling. When a write request is received from the host while the storage device performs the background operation, the storage device may perform a write operation according to the write request. The storage device may selectively perform a map update corresponding to the background operation so as not to conflict with a map update corresponding to the write operation.

SUMMARY

An embodiment of the present disclosure provides a memory controller capable of efficiently performing a map update, and a method of operating the same.

According to an embodiment of the present disclosure, a memory controller may include a write controller and a map manager. The write controller may search, in response to a write request for a second logical address received from a host during a first write operation for a first logical address, for a descriptor corresponding to the first write operation, determine whether the first logical address and the second logical address overlap, and set a map update flag corresponding to the first write operation based on a result of the determination. The map manager may update mapping information on the first logical address based on the map update flag.

According to an embodiment of the present disclosure, a memory controller may include a write controller and a map manager. The write controller may determine, in response to a write request for a target logical address received from a host during an internal writing operation being performed according to a write logical address regardless of a request of the host, whether the write logical address and the target logical address overlap, based on a descriptor corresponding to the internal writing operation, and set a map update flag corresponding to the internal writing operation based on a result of the determination. The map manager may update flapping information on the write logical address based on the map update flag.

According to an embodiment of the present disclosure, a method of operating a memory controller may include searching for a descriptor corresponding to a first write operation in response to a write request for a second logical address received from a host during the first write operation for a first logical address, setting a map update flag corresponding to the first write operation based on a result of determining, based on the descriptor, whether the first logical address and the second logical address overlap, and selectively updating mapping information on the first logical address based on the map update flag.

An operating method of a controller comprises controlling a memory device to perform a first write operation according to a logical address, controlling, without updating map data as a result of the first write operation, the memory device to perform a second write operation according to the logical address, and updating the map data as a result of the second write operation.

According to the present technology, a memory controller and a method of operating the same which efficiently perform a map update are provided.

BRIEF DESCRIPTION OF THE DRAWINGS

FIG. 3 is a diagram illustrating a write operation and map update according to an embodiment of the present disclosure.

DETAILED DESCRIPTION

Specific structural or functional descriptions of embodiments according to the concept which are disclosed in the present specification are illustrated only to describe the embodiments according to the concept of the present disclosure. The embodiments according to the concept of the present disclosure may be carried out in various forms and should not be construed as being limited to the embodiments described in the present specification.

Figure 1:
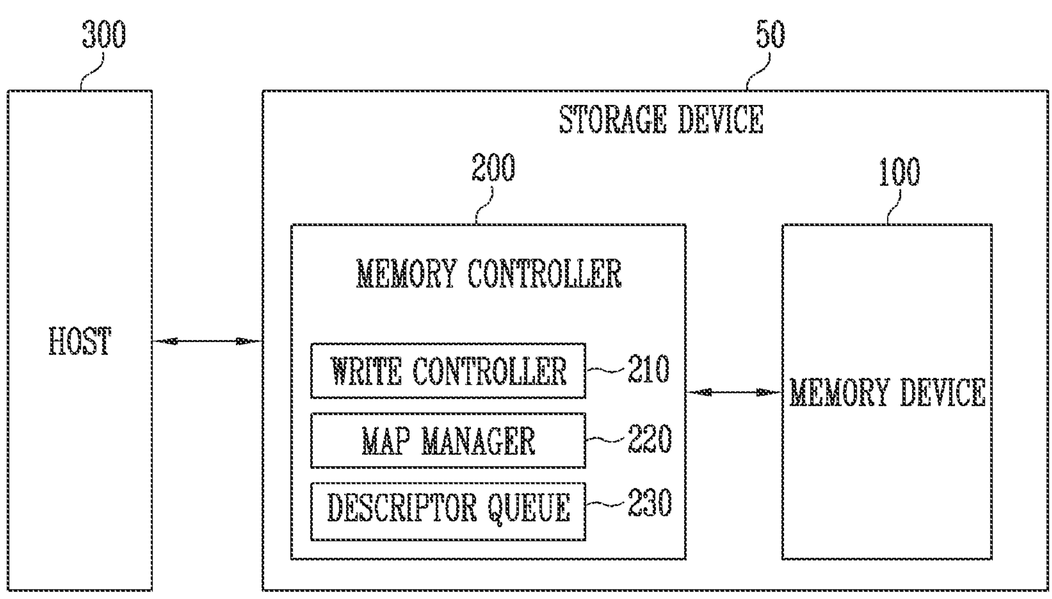
FIG. 1 is a diagram illustrating a storage device according to an embodiment of the present disclosure.

FIG. 1 is a diagram illustrating a storage device according to an embodiment of the present disclosure.

Referring to FIG. 1, the storage device 50 may include a memory device 100 and a memory controller 200 that controls an operation of the memory device. The storage device 50 is a device that stores data under control of a host 300 such as a cellular phone, a smartphone, an MP3 player, a laptop computer, a desktop computer, a game player, a TV, a tablet PC, or an in-vehicle infotainment system.

The storage device 50 may be manufactured as one of various types of storage devices according to a host interface that is a communication method with the host 300. For example, the storage device 50 may be configured as any of various types of storage devices such as an SSD, a multimedia card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and a memory stick.

The storage device 50 may be manufactured as any of various types of packages. For example, the storage device 50 may be manufactured as any of various package types, such as a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data. The memory device 100 operates under control of the memory controller 200, The memory device 100 may include a memory cell array including a plurality of memory cells that store data.

The memory cell array may include a plurality of memory blocks. Each memory block may include a plurality of memory cells. One memory block may include a plurality of pages. In an embodiment, the page may be a unit for storing data in the memory device 100 or reading data stored in the memory device 100.

The memory block may be a unit for erasing data. In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM), a spin transfer torque random access memory (STT-RAM), or the like. In the present specification, for convenience of description, the memory device 100 is a NAND flash memory.

The memory device 100 is configured to receive a command and an address from the memory controller 200 and access an area selected by the address of the memory cell array. That is, the memory device 100 may perform an operation instructed by the command on the area selected by the address. For example, the memory device 100 may perform a write operation (program operation), a read operation, and an erase operation, During the program operation, the memory device 100 may program data to the area selected by the address. During the read operation, the memory device 100 may read data from the area selected by the address, During the erase operation, the memory device 100 may erase data stored in the area selected by the address.

The memory controller 200 controls an overall operation of the storage device 50.

When power is applied to the storage device 50, the memory controller 200 may execute firmware FW. When the memory device 100 is a flash memory device, the memory controller 200 may operate firmware such as a flash translation layer (FTL) for controlling communication between the host 300 and the memory device 100.

In an embodiment, the memory controller 200 may receive data and a logical block address (LBA) from the host 300 and convert the LBA into a physical block address (PBA) indicating an address of memory cells in which data included in the memory device 100 is to be stored.

The memory controller 200 may control the memory device 100 to perform the program operation, the read operation, or the erase operation in response to a request of the host 300. During the program operation, the memory controller 200 may provide a write command, a physical block address, and data to the memory device 100. During the read operation, the memory controller 200 may provide a read command and the physical block address to the memory device 100. During the erase operation, the memory controller 200 may provide an erase command and the physical block address to the memory device 100.

In an embodiment, the memory controller 200 may generate and transmit the command, the address, and the data to the memory device 100 regardless of the request from the host 300. For example, the memory controller 200 may provide the command, the address, and the data to the memory device 100 to perform background operations such as a program operation for wear leveling and a program operation for garbage collection.

In an embodiment, the memory controller 200 may control at least two memory devices 100. In this case, the memory controller 200 may control the memory devices 100 according to an interleaving method to improve operation performance. The interleaving method may be an operation method for overlapping operation periods of at least two memory devices 100.

The memory controller 200 may control a plurality of memory devices 100 connected through at least one or more channels. Each memory device 100 may include at least one or more planes. Each plane may include a plurality of memory blocks.

In an embodiment, the memory controller 200 may include a write controller 210 and a map manager 220. The memory controller 200 may further include a descriptor queue 230.

In an embodiment, the write controller 210 may search, in response to a write request for a second logical address received from the host 300 during a first write operation for a first logical address, the descriptor queue 250 for a descriptor corresponding to the first write operation. The write controller 210 may determine whether the first logical address and the second logical address overlap based on the descriptor. The write controller 210 may set a map update flag corresponding to the first write operation based on a result of the determination. The map update flag may indicate whether a map update operation corresponding to the write operation is performed after the write operation is completed. For example, when the map update flag is set to a second value (i.e., when the map update flag is activated), the map update operation may be performed after the write operation is completed. When the map update flag is set to a first value (i.e., when the map update flag is deactivated), the map update operation may be skipped after the write operation is completed.

The write controller 210 may set the map update flag indicating whether to update mapping information on the first logical address after the first write operation is completed, based on whether the first logical address and the second logical address overlap. For example, when the first logical address and the second logical address overlap, the write controller 210 may set the map update flag corresponding to the first write operation to a first value. When the first logical address and the second logical address are not the same as each other, the write controller 210 may set the map update flag to a second value.

The write controller 210 may control the memory device 100 to perform the first write operation regardless of the request of the host 300. The write controller 210 may control the memory device 100 to perform a second write operation in response to a write request for the second logical address received from the host 300.

The map manager 220 may selectively update the mapping information on the first logical address based on the map update flag. For example, when the map update flag has the first value, the map manager 220 may not update the mapping information on the first logical address after the first write operation is completed. That is, the map manager 220 may skip update of the mapping information on the first logical address. When the map update flag has the second value, the map manager 220 may update the mapping information on the first logical address after the first write operation is completed.

When the second write operation is completed, the map manager 220 may update mapping information on the second logical address.

In an embodiment, the first write operation may be a write operation regardless of the request of the host 300. The first write operation may include a background operation for the memory device 100 as an internal writing operation. The background operation may include a program operation for garbage collection or wear leveling. A type and the number of background operations are not limited to the present embodiment. The second write operation may be a host write operation or an external writing operation as a write operation according to the request of the host 300.

In another embodiment, the first write operation may be an operation according to a write request previously received from the host 300 than a write request corresponding to the second write operation.

The descriptor queue 230 may store the descriptor including information on an operation to be performed according to the request received from the host 300. For example, the descriptor queue 230 may store the descriptor including instructions corresponding to the first write operation and the first logical address. The write controller 210 may control the memory device 100 to perform the first write operation based on the corresponding descriptor.

In an embodiment, the write controller 210 may control the memory device 100 to perform the internal writing operation regardless of the request of the host 300. The internal writing operation may include the program operation of the background operation for the garbage collection and the wear leveling. The write controller 210 may search, in response to a write request for a target logical address received from the host 300 during the internal writing operation, for the descriptor corresponding to the internal writing operation, Separately from the descriptor search, the write controller 210 may control the memory device 100 to perform the host write operation in response to the write request.

The write controller 210 may determine whether a write logical address on which the internal writing operation is performed and the target logical address overlap based on the searched descriptor. The write controller 210 may set the map update flag corresponding to the internal writing operation based on a determination result. When the write logical address and the target logical address overlap, the write controller 210 may set the map update flag to a first value. When the write logical address and the target logical address are different from each other, the write controller 210 may set the map update flag to a second value.

The map manager 220 may update mapping information on the target logical address after the host write operation is completed. The map manager 220 may selectively update the mapping information on the write logical address based on the map update flag corresponding to the internal writing operation. For example, after the internal writing operation is completed, the map manager 220 may update the mapping information on the write logical address or skip update of the mapping information according to the map update flag.

As to be described later with reference to FIGS. 4 to 6, the host write operation may be performed according to the write request received from the host during the internal writing operation on the same logical address. In this case, the map update corresponding to the internal writing operation may be invalid, and the map update corresponding to the host write operation may be valid. Therefore, in order to prevent the map update corresponding to the internal writing operation from being unnecessarily performed, the map update corresponding to the internal writing operation may be selectively performed according to the map update flag. That is, when the map update flag has the first value, the map update corresponding to the internal writing operation may be skipped without being performed.

The host 300 may communicate with the storage device 50 using at least one of various communication standards or interfaces such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

Figure 2:
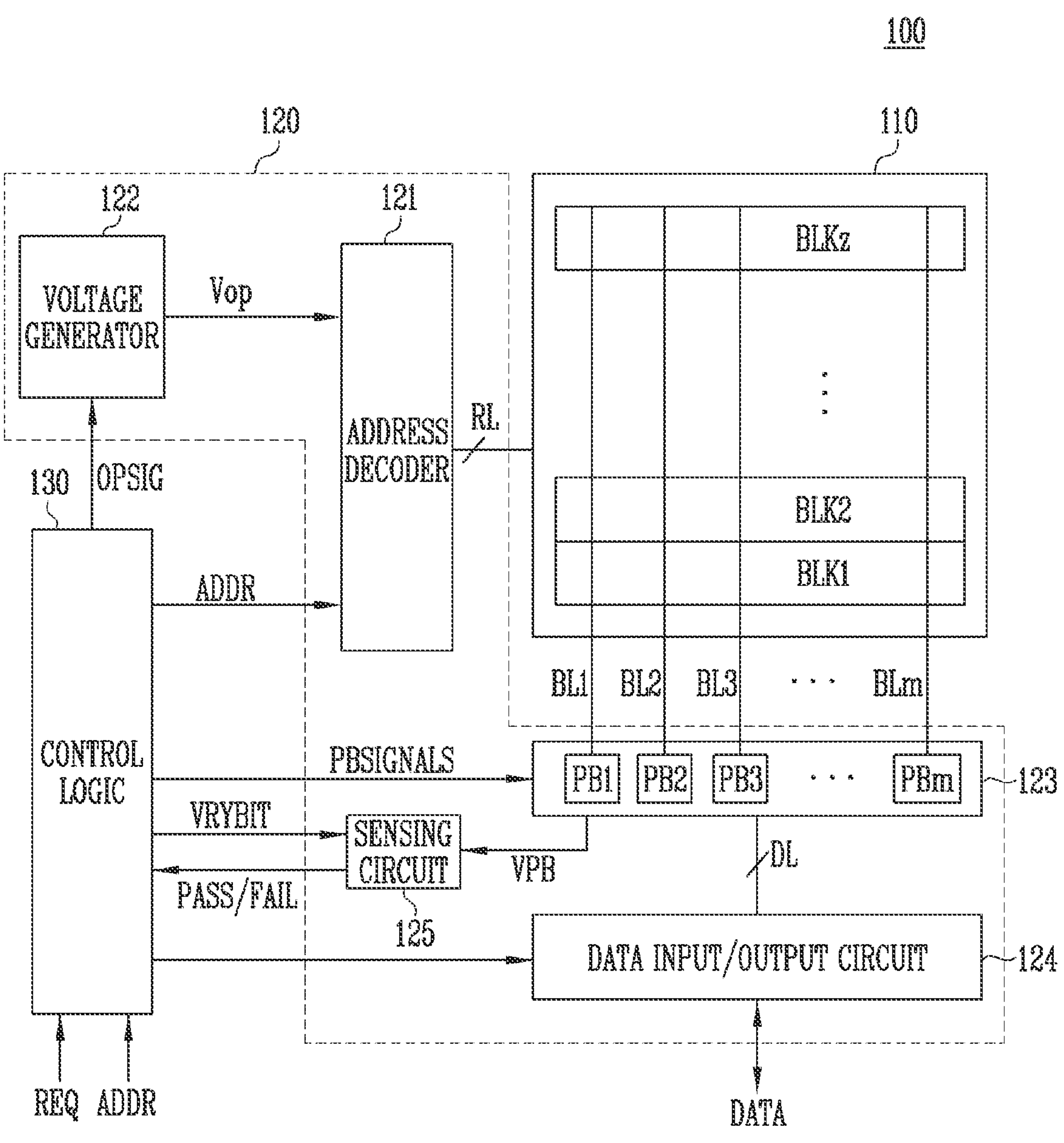
FIG. 2 is a diagram illustrating a structure of a memory device of FIG. 1 according to an embodiment of the present disclosure.

FIG. 2 is a diagram illustrating a structure of the memory device of FIG. 1 according to an embodiment of the present disclosure.

Referring to FIG. 2, the memory device 100 may include a memory cell array 110, a peripheral circuit 120, and a control logic 130.

The memory cell array 110 includes a plurality of memory blocks BLK1 to BLKz. The plurality of memory blocks BLK1 to BLKz are connected to an address decoder 121 through row lines RL. The plurality of memory blocks BLK1 to BLKz are connected to a read and write circuit 123 through bit lines BL1 to BLm. Each of the plurality of memory blocks BLK1 to BLKz includes a plurality of memory cells. In an embodiment, the plurality of memory cells are nonvolatile memory cells. Memory cells connected to the same word line among the plurality of memory cells are defined as one physical page. That is, the memory cell array 110 is configured of a plurality of physical pages. According to an embodiment of the present disclosure, each of the plurality of memory blocks BLK1 to BLKz included in the memory cell array 110 may include a plurality of dummy cells. At least one of the dummy cells may be connected in series between a drain select transistor and the memory cells, and between a source select transistor and the memory cells.

Each of the memory cells of the memory device 100 may be configured as a single level cell (SLC) that stores one data bit, a multi-level cell (MLC) that stores two data bits, a triple level cell (TLC) that stores three data bits, or a quad level cell (QLC) that stores four data bits.

The peripheral circuit 120 may include an address decoder 121, a voltage generator 122, the read and write circuit 123, a data input/output circuit 124, and a sensing circuit 125.

The peripheral circuit 120 drives the memory cell array 110. For example, the peripheral circuit 120 may drive the memory cell array 110 to perform a program operation, a read operation, and an erase operation.

The address decoder 121 is connected to the memory cell array 110 through the row lines RL. The row lines RL may include drain select lines, word lines, source select lines, and a common source line. According to an embodiment of the present disclosure, the word lines may include normal word lines and dummy word lines. According to an embodiment of the present disclosure, the row lines RL may further include a pipe select line.

The address decoder 121 is configured to operate in response to control of the control logic 130. The address decoder 121 receives an address ADDR from the control logic 130.

The address decoder 121 is configured to decode a block address of the received address ADDR. The address decoder 121 selects at least one memory block among the memory blocks BLK1 to BLKz according to the decoded block address. The address decoder 121 is configured to decode a row address of the received address ADDR. The address decoder 121 may select at least one word line among word lines of a selected memory block according to the decoded address. The address decoder 121 may apply an operation voltage Vop received from the voltage generator 122 to the selected word line.

During the program operation, the address decoder 121 may apply a program voltage to a selected word line and apply a pass voltage having a level less than that of the program voltage to unselected word lines. During a program verify operation, the address decoder 121 may apply a verify voltage to the selected word line and apply a verify pass voltage having a level greater than that of the verify voltage to the unselected word lines.

During the read operation, the address decoder 121 may apply a read voltage to the selected word line and apply a read pass voltage having a level greater than that of the read voltage to the unselected word lines.

According to an embodiment of the present disclosure, the erase operation of the memory device 100 is performed in a memory block unit. The address ADDR input to the memory device 100 during the erase operation includes a block address. The address decoder 121 may decode the block address and select at least one memory block according to the decoded block address. During the erase operation, the address decoder 121 may apply a ground voltage to the word lines input to the selected memory block.

According to an embodiment of the present disclosure, the address decoder 121 may be configured to decode a column address of the transmitted address ADDR. The decoded column address may be transmitted to the read and write circuit 123. As an example, the address decoder 121 may include a component such as a row decoder, a column decoder, and an address buffer.

The voltage generator 122 is configured to generate a plurality of operation voltages Vop by using an external power voltage supplied to the memory device 100. The voltage generator 122 operates in response to the control of the control logic 130.

In an embodiment, the voltage generator 122 may generate an internal power voltage by regulating the external power voltage. The internal power voltage generated by the voltage generator 122 is used as an operation voltage of the memory device 100.

In an embodiment, the voltage generator 122 may generate the plurality of operation voltages Vop using the external power voltage or the internal power voltage. The voltage generator 122 may be configured to generate various voltages required by the memory device 100. For example, the voltage generator 122 may generate a plurality of erase voltages, a plurality of program voltages, a plurality of pass voltages, a plurality of selection read voltages, and a plurality of non-selection read voltages.

In order to generate the plurality of operation voltages Vop having various voltage levels, the voltage generator 122 may include a plurality of pumping capacitors that receive the internal voltage and selectively activate the plurality of pumping capacitors in response to the control logic 130 to generate the plurality of operation voltages Vop. The plurality of generated operation voltages Vop may be supplied to the memory cell array 110 by the address decoder 121.

The read and write circuit 123 includes first to m-th page buffers PB1 to PBm. The first to m-th page buffers PB1 to PBm are connected to the memory cell array 110 through first to m-th bit lines BL1 to BLm, respectively. The first to m-th page buffers PB1 to PBm operate in response to the control of the control logic 130.

The first to m-th page buffers PB1 to PBm communicate data DATA with the data input/output circuit 124. At a time of the program operation, the first to m-th page buffers PB1 to PBm receive the data DATA to be stored through the data input/output circuit 124 and data lines DL.

During the program operation, when a program voltage is applied to the selected word line, the first to m-th page buffers PB1 to PBm may transmit the data DATA to be stored, that is, the data DATA received through the data input/output circuit 124 to the selected memory cells through the bit lines BL1 to BLm. The memory cells of the selected page are programmed according to the transmitted data DATA. A memory cell connected to a bit line to which a program permission voltage (for example, a ground voltage) is applied may have an increased threshold voltage. A threshold voltage of a memory cell connected to a bit line to which a program inhibition voltage (for example, a power voltage) is applied may be maintained. During the program verify operation, the first to m-th page buffers PB1 to PBm read the data DATA stored in the memory cells from the selected memory cells through the bit lines BL1 to BLm.

During the read operation, the read and write circuit 123 may read the data DATA from the memory cells of the selected page through the bit lines BL1 to BLm and store the read data DATA in the first to m-th page buffers PB1 to PBm.

During the erase operation, the read and write circuit 123 may float the bit lines BL1 to BLm. In an embodiment, the read and write circuit 123 may include a column select circuit.

The data input/output circuit 124 is connected to the first to m-th page buffers PB1 to PBm through the data lines DL.

The data input/output circuit 124 operates in response to the control of the control logic 130.

The data input/output circuit 124 may include a plurality of input/output buffers (not shown) that receive input data DATA. During the program operation, the data input/output circuit 124 receives the data DATA to be stored from an external controller (not shown). During the read operation, the data input/output circuit 124 outputs the data DATA transmitted from the first to m-th page buffers PB1 to PBm included in the read and write circuit 123 to the external controller.

During the read operation or the verify operation, the sensing circuit 125 may generate a reference current in response to a signal of an allowable bit VRYBIT generated by the control logic 130 and may compare a sensing voltage VPB received from the read and write circuit 123 with a reference voltage generated by the reference current to output a pass signal or a fail signal to the control logic 130.

The control logic 130 may be connected to the address decoder 121, the voltage generator 122, the read and write circuit 123, the data input/output circuit 124, and the sensing circuit 125. The control logic 130 may be configured to control all operations of the memory device 100. The control logic 130 may operate in response to a command CMD transmitted from an external device.

The control logic 130 may generate various signals in response to the command CMD and the address ADDR to control the peripheral circuit 120. For example, the control logic 130 may generate an operation signal OPSIG, the address ADDR, a read and write circuit control signal PBSIGNALS, and the allowable bit VRYBIT in response to the command CMD and the address ADDR. The control logic 130 may output the operation signal OPSIG to the voltage generator 122, output the address ADDR to the address decoder 121, output the read and write control signal to the read and write circuit 123, and output the allowable bit VRYBIT to the sensing circuit 125. In addition, the control logic 130 may determine whether the verify operation is passed or failed in response to the pass or fail signal PASS/FAIL output by the sensing circuit 125.

FIG. 3 is a diagram illustrating the write operation and the map update according to an embodiment of the present disclosure.

Referring to FIG. 3, a memory block BLK may include first to fourth pages Page_1 to Page_4, Physical addresses of the first to fourth pages Page_1 to Page_4 may be first to fourth physical addresses PA_1 to PA_4.

In Case 1, before external writing for the first logical address LA_1 is performed, the first and second pages Page_1 and Page_2 may be valid pages storing valid data.

The external writing may be performed in response to a write request for a first logical address LA_1 received from the host. New data received from the host may be stored in the third page Page_3 according to the external writing. Therefore, existing data stored in the first page Page_1 indicated by the first physical address PA_1 previously mapped to the first logical address PA_1 may be treated as invalid data. Mapping information may be updated so that a physical address mapped to the first logical address LA_1 is changed from the first physical address PA_1 to the third physical address PA_3 corresponding to the third page Page_3 in which the new data is stored.

In Case 2, before internal writing for the first logical address LA_1 is performed, the first and second pages Page_1 and Page_2 may be valid pages storing valid data.

Regardless of the write request of the host, the internal writing for the first logical address LA_1 may be performed. The existing data stored in the first page Page_1 may be stored in the third page Page_3 according to the internal writing.

Therefore, as the existing data is moved from the first page Page_1 to the third page Page_3, the mapping information may be updated so that the physical address mapped to the first logical address LA_1 is changed from the first physical address PA_1 to the third physical address PA_3.

Figure 4:
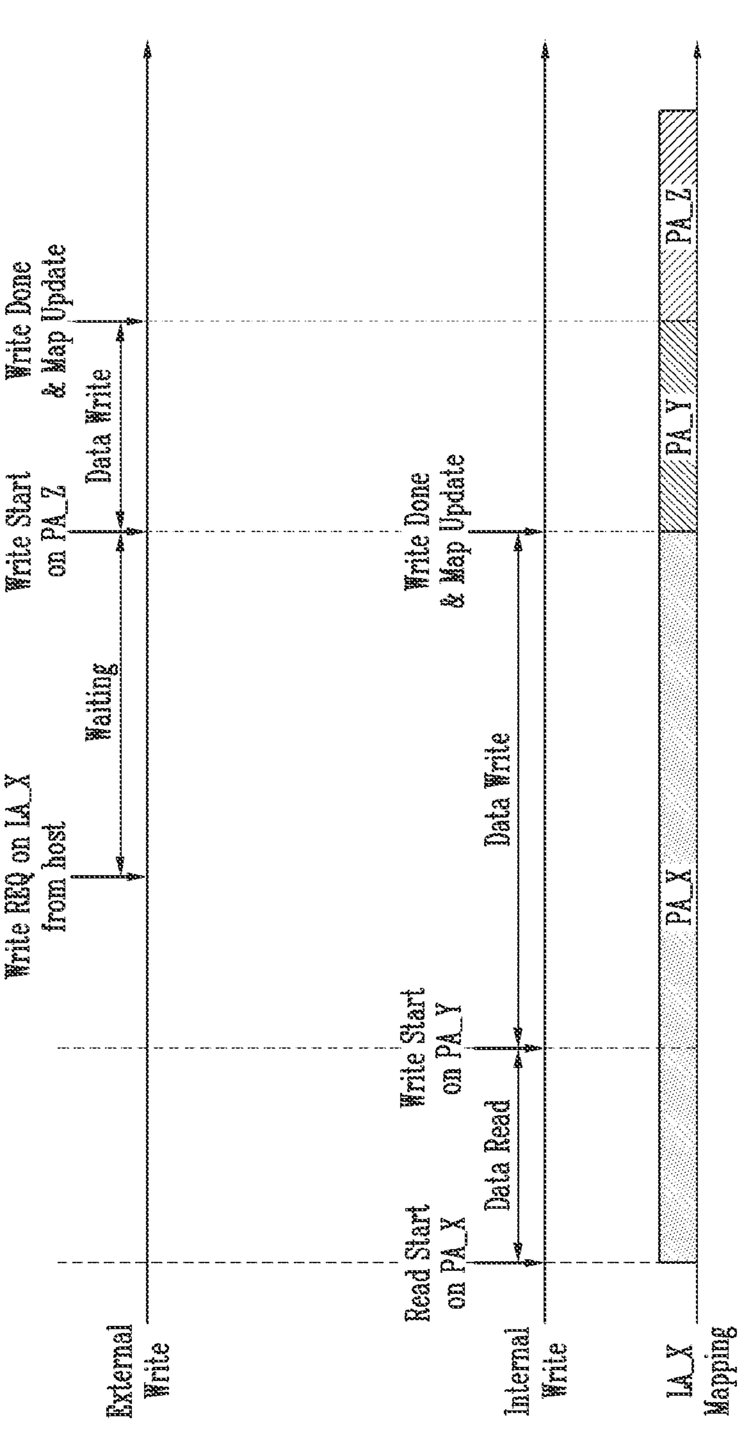
FIG. 4 is a diagram illustrating internal writing and external writing according to an embodiment of the present disclosure.

FIG. 4 is a diagram illustrating internal writing and external writing according to an embodiment of the present disclosure.

Referring to FIG. 4, before the internal writing is performed, a logical address LA_X may be mapped to a physical address PA_X.

According to the internal writing, data reading for an area indicated by the physical address PA_X may be performed. Writing of the read data may be performed to the area indicated by a new physical address PA_Y. While the writing of the data is performed according to the internal writing, a write request for the logical address LA_X may be received from the host.

In FIG. 4, in order to prevent map update corresponding to the external writing and map update corresponding to the internal writing from colliding, the external writing may be queued until the internal writing is completed.

After the internal writing is completed, the map update corresponding to the internal writing may be performed, and a physical address corresponding to the logical address LA_X may be changed from the physical address PA_X to the physical address PA_Y.

The external writing may be performed after the internal writing is completed. In response to a write request for the logical address LA_X received from the host, writing of the new data received from the host may be performed in an area indicated by the physical address PA_Z. After the external writing is completed, the map update corresponding to the external writing may be performed, and the physical address corresponding to the logical address LA_X may be changed from the physical address PA_Y to a physical address PA_Z.

In the embodiment described with reference to FIG. 4, the map update corresponding to the external writing and the map update corresponding to the internal writing may be prevented from colliding.

However, a resource may be wasted in that the external writing is delayed until the internal writing is completed and the map update corresponding to the unnecessary internal writing is performed.

Figure 5:
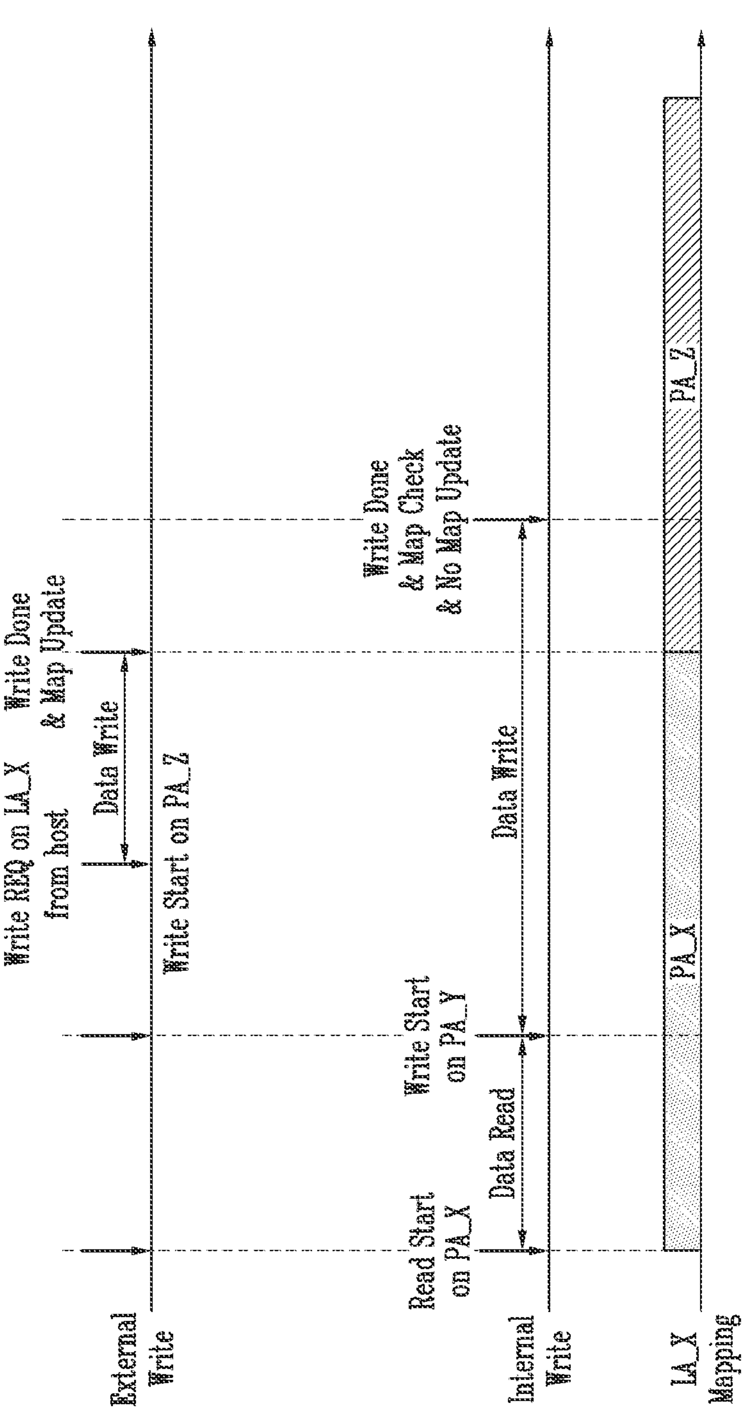
FIG. 5 is a diagram illustrating internal writing and external writing according to an embodiment of the present disclosure.

FIG. 5 is a diagram illustrating an internal writing and an external writing according to an embodiment of the present disclosure.

Referring to FIG. 5, before the internal writing is performed, the logical address LA_X may be mapped to the physical address PA_X.

According to the internal writing, data read on the area indicated by the physical address PA_X may be performed. Writing of the read data may be performed on an area indicated by the new physical address PA_Y. While the writing of the data is performed according to the internal writing, the write request for the logical address LA_X may be received from the host.

In FIG. 5, the external writing may be individually performed regardless of whether the internal writing is completed. In response to the write request for the logical address LA_X received from the host, writing of new data received from the host may be performed in the area indicated by the physical address PA_Z. After the external writing is completed, the map update corresponding to the external writing may be performed, and the physical address corresponding to the logical address LA_X may be changed from the physical address PA_X to the physical address PA_Z.

In order to prevent the map update corresponding to the external writing and the map update corresponding to the internal writing from colliding, mapping information on the logical address LA_X may be checked after the internal writing is completed. At a time point when the mapping information is checked, when a physical address corresponding to the logical address LA_X is the same as a physical address before the internal writing is performed, the map update corresponding to the internal writing may be performed. At the time point when the mapping information is checked, when the physical address corresponding to the logical address LA_X is different from the physical address before the internal writing is performed, the map update corresponding to the internal writing may not be performed.

In FIG. 5, at the time point when the mapping information on the logical address LA_X is checked, the physical address PA_Z corresponding to the logical address LA_X is different from the physical address PZ_X before the internal writing is performed, and thus the map update corresponding to the internal writing may not be performed and may be skipped.

In the embodiment described with reference to FIG. 5, the map update corresponding to the external writing and the map update corresponding to the internal writing may be prevented from colliding. In addition, a resource may be saved in that the external writing may be immediately performed without being required to wait until the internal writing is completed and the map update corresponding to the unnecessary internal writing is not performed.

However, after the internal writing is completed, in order to check the mapping information on the logical address LA_X, the mapping information is required to be loaded into a buffer memory. When a capacity of the buffer memory is small compared to a size of the mapping information or the buffer memory does not exist, the embodiment described with reference to FIG. 5 may be limited.

Figure 6:
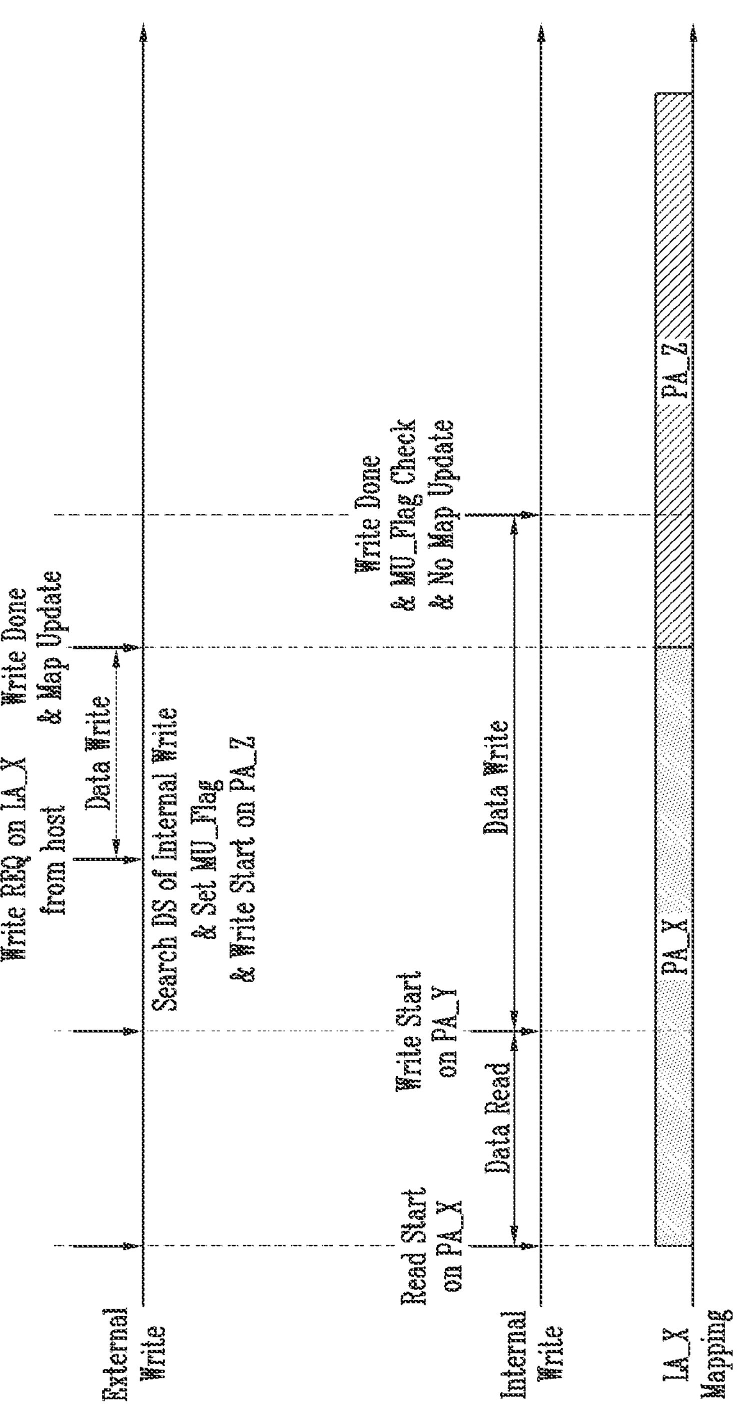
FIG. 6 is a diagram illustrating internal writing and external writing according to an embodiment of the present disclosure.

FIG. 6 is a diagram illustrating an internal writing and an external writing according to an embodiment of the present disclosure.

Referring to FIG. 6, before the internal writing is performed, the logical address LA_X may be mapped to the physical address PA_X.

According to the internal writing, data read for the area indicated by the physical address PA_X may be performed. Writing of the read data may be performed to the area indicated by the new physical address PA_Y. While the writing of the data is performed according to the internal writing, the write request for the logical address LA_X may be received from the host.

In FIG. 6, the external writing according to the write request may be individually performed regardless of whether the internal writing is completed. Writing of the new data received from the host may be performed in the area indicated by the physical address PA_Z according to the external writing.

A map update flag MU_Flag may be set to prevent the map update corresponding to the external writing and the map update corresponding to the internal writing from colliding.

For example, in response to the write request for the logical address LA_X received from the host, a descriptor DS corresponding to the internal writing may be searched. Based on the descriptor DS, it may be determined whether a write logical address corresponding to the internal writing and a target logical address requested to be written from the host overlap. The map update flag MU_Flag indicating whether to perform the map update corresponding to the internal writing may be set according to whether the write logical address and the target logical address overlap. The map update flag MU_Flag may be set to a first value when the write logical address and the target logical address overlap, and may be set to a second value when the write logical address and the target logical address are not the same as each other.

In FIG. 6, since the write logical address and the target logical address are the same as the logical address LA_X, the map update flag MU_Flag may be set to a first value.

After the external writing is completed, the map update corresponding to the external writing may be performed, and the physical address corresponding to the logical address LA_X may be changed from the physical address PA_X to the physical address PA_Z.

After the internal writing is completed, the map update flag MU_Flag may be checked. Since the map update flag MU_Flag has the first value, the map update corresponding to the internal writing may not be performed.

In the embodiment described with reference to FIG. 6, the map update corresponding to the external writing and the map update corresponding to the internal writing may be prevented from colliding. In addition, a resource may be saved in that the external writing may be immediately performed without being required to wait until the internal writing is completed and the map update corresponding to the unnecessary internal writing is not performed.

In addition, in comparison with the embodiment described with reference to FIG. 5, in order to determine whether to update the map corresponding to the internal writing, the memory controller only needs to check the map update flag without loading the mapping information on the logical address LA_X into the buffer memory. Therefore, there is an advantage in that a resource may be saved even though there is a constraint that the capacity of the buffer memory is small compared to the size of the mapping information or the buffer memory does not exist.

Figure 7:
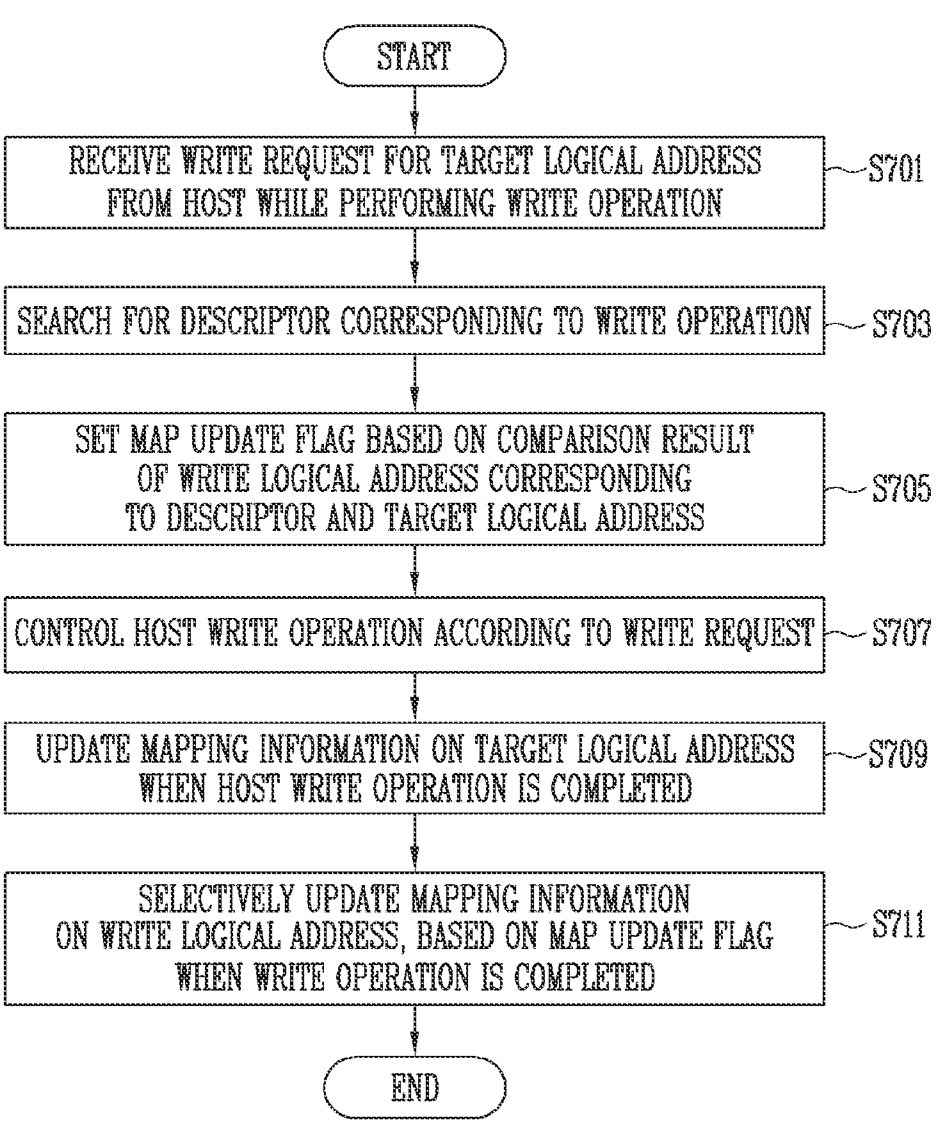
FIG. 7 is a flowchart illustrating an operation of a memory controller according to an embodiment of the present disclosure.

FIG. 7 is a flowchart illustrating an operation of a memory controller according to an embodiment of the present disclosure.

Referring to FIG. 7, in operation S701, the memory controller may receive the write request for the target logical address from the host while performing the write operation. At this time, the write operation may be the internal writing operation as the background operation regardless of the request of the host.

In operation S703, the memory controller may search for the descriptor corresponding to the currently performed write operation. The descriptor may include the write logical address and the instructions corresponding to the write operation.

In operation S705, the memory controller may set the map update flag based on a comparison result between the write logical address corresponding to the descriptor and the target logical address. For example, the memory controller may set the map update flag to a first value when the write logical address and the target logical address overlap. The memory controller may set the map update flag to a second value when the write logical address and the target logical address are not the same as each other.

In operation S707, the memory controller may control the memory device to perform the host write operation according to the write request received from the host.

In operation S709, the memory controller may update the mapping information on the target logical address when the host write operation is completed. For example, the memory controller may change the existing physical address mapped to the target logical address to the physical address indicating the area in which the new data received from the host is stored.

In operation S711, when performing the write operation is completed before the write request is received from the host, the memory controller may selectively update the mapping information on the write logical address based on the map update flag. For example, when the map update flag has the second value, the memory controller may update the mapping information on the write logical address, and when the map update flag has the first value, the memory controller may skip the update of the mapping information.

Figure 8:
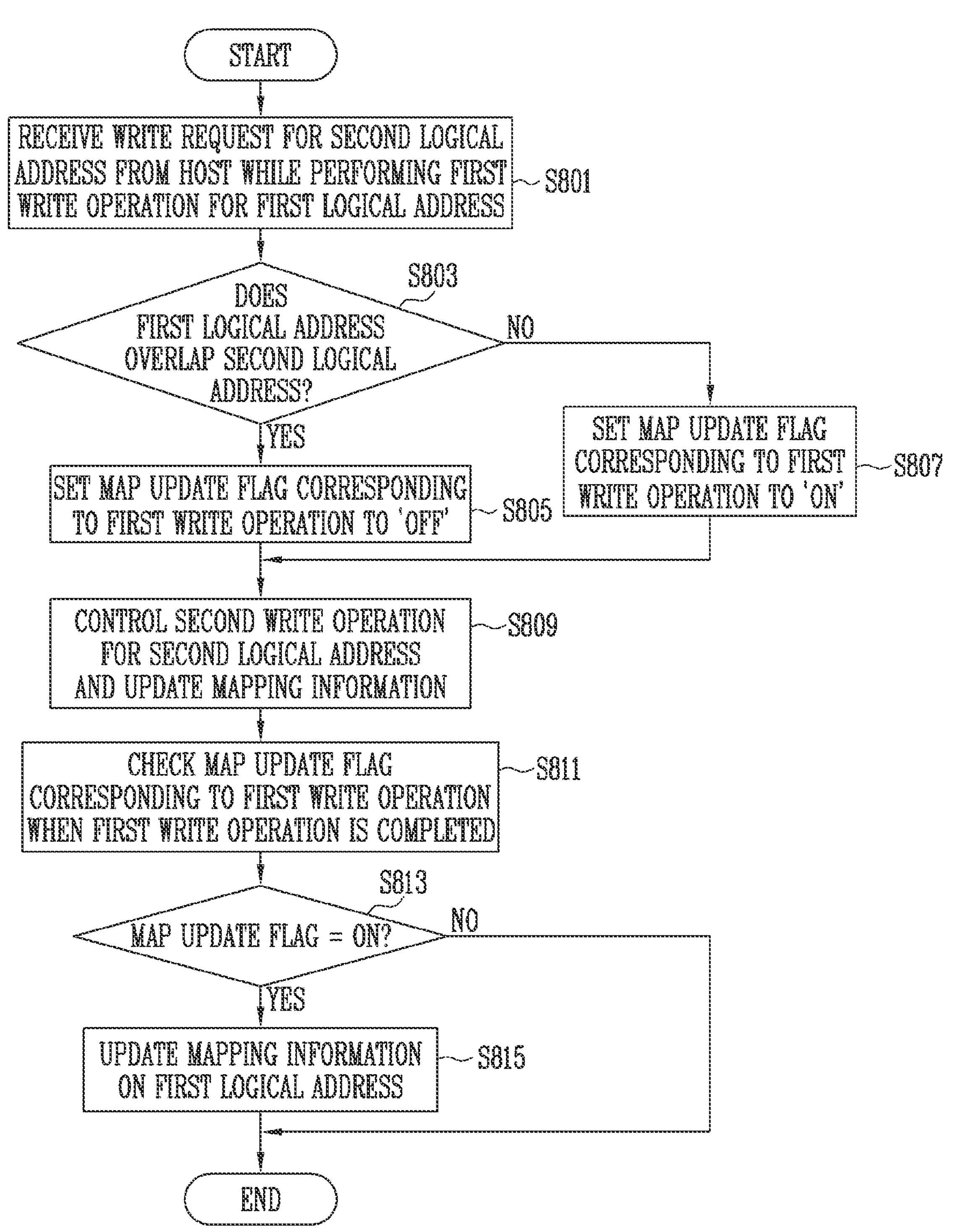
FIG. 8 is a flowchart illustrating an operation of a memory controller according to an embodiment of the present disclosure.

FIG. 8 is a flowchart illustrating an operation of a memory controller according to an embodiment of the present disclosure.

Referring to FIG. 8, in operation S801, the memory controller may receive the rite request for the second logical address from the host while the first write operation for the first logical address is performed.

In operation S803, the memory controller may determine whether the first logical address and the second logical address overlap. Specifically, the memory controller may identify the first logical address based on the descriptor corresponding to the first write operation. The memory controller may determine whether the identified first logical address and the second logical address received from the host overlap. As a result of determination, when the first logical address and the second logical address overlap, the operation proceeds to operation S805, and when the first logical address and the second logical address are not the same as each other, the operation proceeds to operation S807.

In operation S805, the memory controller may set the map update flag corresponding to the first write operation to a first value.

In operation S807, the memory controller may set the map update flag corresponding to the first write operation to a second value.

In operation S809, the memory controller may control the memory device to perform the second write operation for the second logical address. When the second write operation is completed, the memory controller may update the mapping information on the second logical address.

When the first write operation is completed in operation S811, the memory controller may check the map update flag corresponding to the first write operation.

In operation S813, the memory controller may determine whether the map update flag has the second value. As a result of determination, when the map update flag has the second value, the operation proceeds to operation S815. When the flag has the first value, the operation is ended. That is, the update of the mapping information on the first logical address may be skipped.

In operation S815, the memory controller may update the mapping information on the first logical address. That is, in the mapping information, the memory controller may change the existing physical address mapped to the first logical address to a new physical address indicating an area on which the first write operation is performed.

Figure 9:
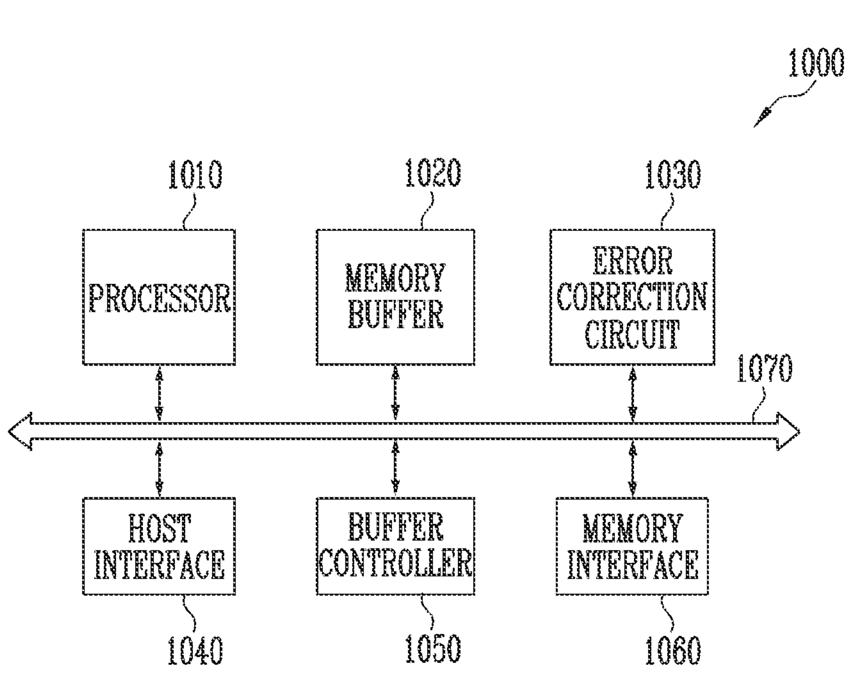
FIG. 9 is a diagram illustrating a memory controller of FIG. 1 according to another embodiment of the present disclosure.

FIG. 9 is a diagram illustrating the memory controller of FIG. 1 according to another embodiment of the present disclosure.

Referring to FIG. 9, the memory controller 1000 is connected to a host and the memory device. The memory controller 1000 is configured to access the memory device in response to a request from the host. For example, the memory controller 1000 is configured to control the write, read, erase, and background operations of the memory device. The memory controller 1000 is configured to provide an interface between the memory device and the host. The memory controller 1000 is configured to drive firmware for controlling the memory device.

The memory controller 1000 may include a processor 1010, a memory buffer 1020, an error correction circuit (ECC) 1030, a host interface 1040, a buffer control circuit 1050, a memory interface 1060, and a bus 1070.

The bus 1070 may be configured to provide a channel between components of the memory controller 1000.

The processor 1010 may control an overall operation of the memory controller 1000 and may perform a logical operation. The processor 1010 may communicate with an external host through the host interface 1040 and communicate with the memory device through the memory interface 1060. In addition, the processor 1010 may communicate with the memory buffer 1020 through the buffer controller 1050. The processor 1010 may control an operation of the storage device using the memory buffer 1020 as an operation memory, a cache memory, or a buffer memory.

The processor 1010 may perform a function of an FTL. The processor 1010 may convert an LBA provided by the host into a PBA through the FTL. The FTL may receive the LBA using a mapping table and convert the LBA into the PBA. An address mapping method of the flash translation layer may include various methods according to a mapping unit. A representative address mapping method includes a page mapping method, a block mapping method, and a hybrid mapping method.

The processor 1010 is configured to randomize data received from the host. For example, the processor 1010 may randomize the data received from the host using a randomizing seed. The randomized data is provided to the memory device as data to be stored and is programmed to the memory cell array.

The processor 1010 is configured to de-randomize data received from the memory device during the read operation. For example, the processor 1010 may de-randomize the data received from the memory device using a de-randomizing seed. The de-randomized data may be output to the host.

In an embodiment, the processor 1010 may perform the randomization and the de-randomization by driving software or firmware.

The memory buffer 1020 may be used as an operation memory, a cache memory, or a buffer memory of the processor 1010. The memory buffer 1020 may store codes and commands executed by the processor 1010. The memory buffer 1020 may store data processed by the processor 1010. The memory buffer 1020 may include a static RAM (SRAM) or a dynamic RAM (DRAM).

The ECC 1030 may perform error correction. The ECC 1030 may perform error correction encoding (ECC encoding) based on data to be written to the memory device through memory interface 1060. The error correction encoded data may be transmitted to the memory device through the memory interface 1060. The ECC 1030 may perform error correction decoding (ECC decoding) on the data received from the memory device through the memory interface 1060. For example, the ECC 1030 may be included in the memory interface 1060 as a component of the memory interface 1060.

The host interface 1040 is configured to communicate with an external host under control of the processor 1010. The host interface 1040 may be configured to perform communication using at least one of various communication standards or interfaces such as a universal serial bus (USB), a serial AT attachment (SATA), a serial attached SCSI (SAS), a high speed interchip (HSIC), a small computer system interface (SCSI), a peripheral component interconnection (PCI express), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

The buffer controller 1050 is configured to control the memory buffer 1020 under the control of the processor 1010.

The memory interface 1060 is configured to communicate with the memory device under the control of the processor 1010. The memory interface 1060 may communicate a command, an address, and data with the memory device through a channel.

For example, the memory controller 1000 may not include the memory buffer 1020 and the buffer controller 1050.

For example, the processor 1010 may control the operation of the memory controller 1000 using codes. The processor 1010 may load the codes from a nonvolatile memory device (for example, a read only memory) provided inside the memory controller 1000. As another example, the processor 1010 may load the codes from the memory device through the memory interface 1060.

For example, the bus 1070 of the memory controller 1000 may be divided into a control bus and a data bus. The data bus may be configured to transmit data within the memory controller 1000 and the control bus may be configured to transmit control information such as a command and an address within the memory controller 1000. The data bus and the control bus may be separated from each other and may not interfere with each other or affect each other. The data bus may be connected to the host interface 1040, the buffer controller 1050, the ECC 1030, and the memory interface 1060. The control bus may be connected to the host interface 1040, the processor 1010, the buffer controller 1050, the memory buffer 1202, and the memory interface 1060.

In an embodiment, the write controller 210 and the map manager 220 described with reference to FIG. 1 may be included in the processor 1010. The descriptor queue 230 may be included in the memory buffer 1020.

Figure 10:
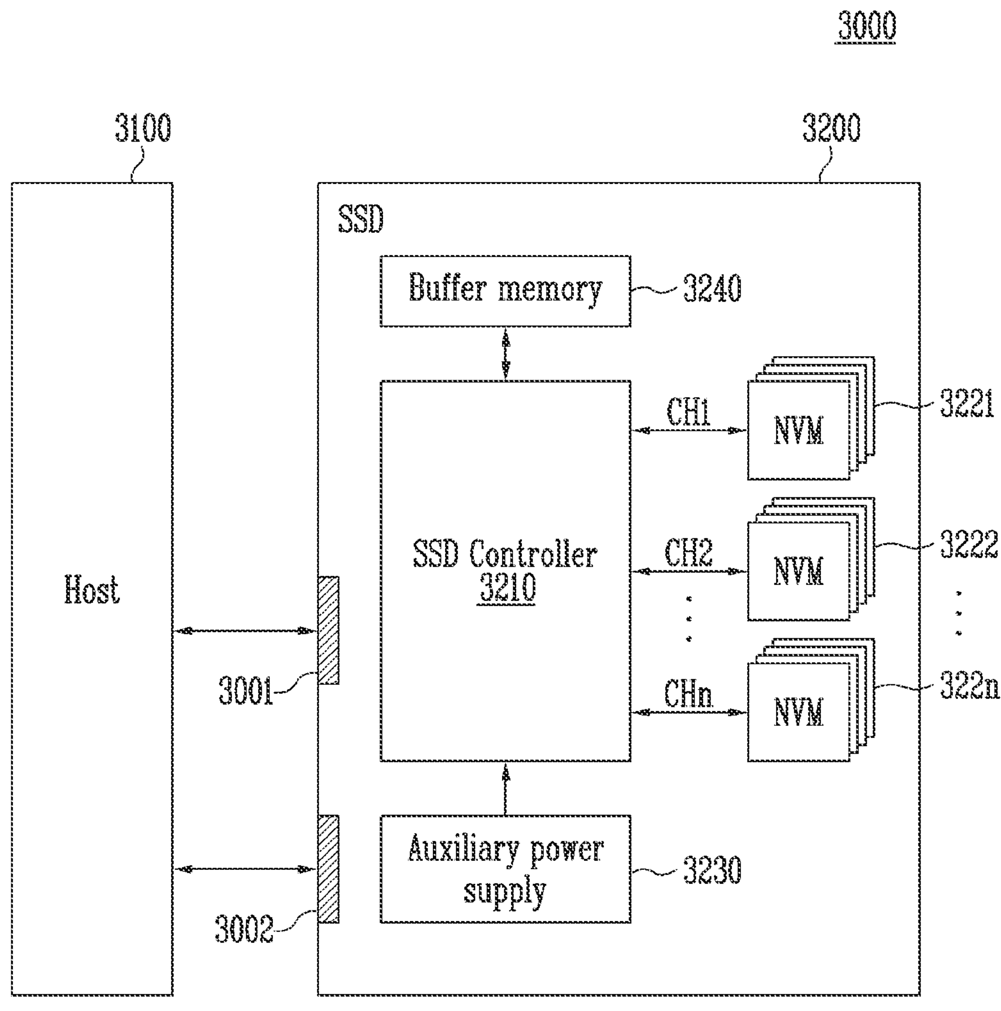
FIG. 10 is a block diagram illustrating a solid state drive (SSD) system to which a storage device according to an embodiment of the present disclosure is applied.

FIG. 10 is a block diagram illustrating a solid state drive (SSD) system to which a storage device according to an embodiment of the present disclosure is applied.

Referring to FIG. 10, the SSD system 3000 includes a host 3100 and an SSD 3200. The SSD 3200 exchanges a signal with the host 3100 through a signal connector 3001 and receives power through a power connector 3002. The SSD 3200 includes an SSD controller 3210, a plurality of flash memories 3221 to **322*n*, an auxiliary power device 3230, and a buffer memory 3240**.

According to an embodiment of the present disclosure, the SSD controller 3210 may perform the function of the memory controller 200 described with reference to FIG. 1.

The SSD controller 3210 may control the plurality of flash memories 3221 to **322*n* in response to the signal received from the host 3100. For example, the signal may be signals based on an interface between the host 3100 and the SSD 3200**. For example, the signal may be a signal defined by at least one of interfaces such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The auxiliary power device 3230 is connected to the host 3100 through the power connector 3002. The auxiliary power device 3230 may receive the power from the host 3100 and may charge the power. The auxiliary power device 3230 may provide power to the SSD 3200 when power supply from the host 3100 is not smooth. For example, the auxiliary power device 3230 may be positioned in the SSD 3200 or may be positioned outside the SSD 3200. For example, the auxiliary power device 3230 may be positioned on a main board and may provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to **322*n*, or may temporarily store meta data (for example, a mapping table) of the flash memories 3221 to 322*n*. The buffer memory 3240** may include a volatile memory such as a DRAM, an SDRAM, a DDR SDRAM, an LPDDR SDRAM, and a GRAM, or a nonvolatile memory such as an FRAM, a ReRAM, an STT-MRAM, and a PRAM.

Various embodiments of the present invention have been illustrated and described. Although specific terminologies are used herein, they are used only in the descriptive sense. The present invention is not limited to or by any such term nor any of the above-described embodiments, as many variations are possible within the spirit and scope of the present invention. The present invention encompasses all such variations to the extent that they fall within the scope of the following claims. Furthermore, the embodiments may be combined to form additional embodiments.

What is claimed is:

1. A memory controller comprising:

a write controller configured to search, in response to a write request for a second logical address received from a host during a first write operation for a first logical address, for a descriptor corresponding to the first write operation, determine whether the first logical address and the second logical address are the same as each other, and set a map update flag corresponding to the first write operation based on a result of the determination; and a map manager configured to update a physical address corresponding to the first logical address after the first write operation is completed when the map update flag indicates the first logical address and the second logical address are the same as each other, wherein the map manager is further configured to not update the physical address corresponding to the first logical address after the first write operation is completed when the map update flag does not indicate the first logical address and the second logical address are the same as each other.

2. The memory controller of claim 1, wherein the write controller sets the map update flag indicating whether to update the physical address corresponding to the first logical address after the first write operation is completed, based on whether the first logical address and the second logical address are the same as each other.

3. The memory controller of claim 2, wherein the write controller sets the map update flag to a first value when the first logical address and the second logical address are the same as each other.

4. The memory controller of claim 2, wherein the write controller sets the map update flag to a second value when the first logical address is different from the second logical address.

5. The memory controller of claim 1, wherein the map manager updates the physical address corresponding to the first logical address when the map update flag indicates the first logical address and the second logical address are the same as each other, and does not update the physical address corresponding to the first logical address when the map update flag does not indicate the first logical address and the second logical address are the same as each other.

6. The memory controller of claim 1, wherein the write controller is further configured to control a memory device to perform a second write operation in response to the received write request.

7. The memory controller of claim 6, wherein the map manager is further configured to update the physical address corresponding to the second logical address when the second write operation is completed.

8. The memory controller of claim 1, further comprising a descriptor queue configured to store the descriptor, wherein the descriptor includes instructions corresponding to the first write operation and the first logical address.

9. The memory controller of claim 1, wherein the write controller is further configured to control a memory device to perform the first write operation regardless of a request of the host.

10. A memory controller comprising:

a write controller configured to determine, in response to a write request for a target logical address received from a host during an internal writing operation being performed according to a write logical address regardless of a request of the host, whether the write logical address and the target logical address are the same as each other, based on a descriptor corresponding to the internal writing operation, and set a map update flag corresponding to the internal writing operation based on a result of the determination; and a map manager configured to update a physical address corresponding to the write logical address after the internal writing operation is completed when the map update flag indicates the write logical address and the target logical address are the same as each other, wherein the map manager is further configured to not update the physical address corresponding to the write logical address after the internal writing operation is completed when the map update flag does not indicate the write logical address and the target logical address are the same as each other.

11. The memory controller of claim 10, wherein the write controller sets the map update flag to a first value when the write logical address and the target logical address are the same as each other, and sets the map update flag to a second value when the write logical address and the target logical address are different from each other.

12. The memory controller of claim 11, wherein the map manager is configured to update the physical address corresponding to the write logical address after the internal writing operation is completed when the map update flag indicates the write logical address and the target logical address are the same as each other, and not to update the physical address corresponding to the write logical address when the map update flag does not indicate the write logical address and the target logical address are the same as each other.

13. The memory controller of claim 10, wherein the write controller is further configured to control a memory device to perform a host write operation in response to the received write request, and wherein the map manager is further configured to update a physical address corresponding to the target logical address after the host write operation is completed.

14. The memory controller of claim 10, wherein the internal writing operation includes a program operation of a background operation for garbage collection and wear leveling.

15. A method of operating a memory controller, the method comprising:

performing a first write operation for a first logical address;

receiving from a host a write request for a second logical address while performing the first write operation;

searching for a descriptor corresponding to the first write operation in response to receiving the write request;

determining, based on the descriptor, whether the first logical address and the second logical address are the same as each other;

setting a map update flag corresponding to the first write operation based on a result of the determining;

checking the map update flag corresponding to the first write operation after completion of the first write operation; and performing a map update operation for the first logical address selectively based on the checked map update flag by:

skipping updating of a physical address corresponding to the first logical address when the map update flag has a first value indicating that the first logical address and the second logical address are the same as each other; and updating the physical address corresponding to the first logical address when the map update flag has a second value indicating that the first logical address and the second logical address are different from each other.

16. The method of claim 15, wherein the setting the map update flag comprises:

setting the map update flag to a first value when the first logical address and the second logical address are the same as each other; and setting the map update flag to a second value when the first logical address is different from the second logical address.

17. The method of claim 15, wherein performing the map update operation for the first logical address selectively comprises:

skipping updating the physical address corresponding to the first logical address when the map update flag has the first value; and updating the physical address corresponding to the first logical address when the map update flag has the second value.

18. The method of claim 15, further comprising:

controlling a memory device to perform a second write operation for the second logical address after receiving the write request; and updating mapping information for the second logical address after completion of the second write operation.

19. The method of claim 15, wherein performing the first write operation comprises controlling the memory device to perform an internal writing operation regardless of a request of the host, the internal writing operation including a program operation for at least one of garbage collection and wear leveling, and wherein receiving the write request for the second logical address occurs while the internal writing operation is being performed.

* * * * *